(12) United States Patent
Verma et al.

(10) Patent No.: US 10,928,219 B2
(45) Date of Patent: Feb. 23, 2021

(54) METERING SYSTEM RESPONSE BASED ON INCIDENT-RELATED NOTIFICATION FROM THIRD PARTY SYSTEM

(71) Applicant: Itron, Inc., Liberty Lake, WA (US)

(72) Inventors: Dinkar Kumar Verma, Bengaluru (IN); Ravi Kumar Kadiyala, Bengaluru (IN)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 16/206,121

(22) Filed: Nov. 30, 2018

(65) Prior Publication Data

US 2020/0173810 A1    Jun. 4, 2020

(51) Int. Cl.
*G01D 4/00* (2006.01)
*G01D 3/08* (2006.01)
(Continued)

(52) U.S. Cl.
CPC .............. *G01D 4/002* (2013.01); *G01D 3/08* (2013.01); *G01D 21/00* (2013.01); *G06Q 50/06* (2013.01);
(Continued)

(58) Field of Classification Search
CPC .......... G01D 4/002; G01D 3/08; G01D 21/00; G06Q 50/06; H04L 67/125; H04Q 9/00;
(Continued)

(56) References Cited

U.S. PATENT DOCUMENTS 7,458,387 B2   12/2008  McGill 8,054,199 B2   11/2011  Addy
(Continued)

FOREIGN PATENT DOCUMENTS

| EP | 1062645 B1 | 11/2002 | |
| WO | WO-2011068273 A1 * | 6/2011 | ......... H04L 12/2827 |
| WO | 2018209238 A1 | 11/2018 | |

OTHER PUBLICATIONS

"Energy Systems, Electricity, and Fire Safety," Course Code AP 312, University School of Planning and Architecture, Guru Gobind Singh Indraprastha University, Delhi, India, Jun. 13, 2015, found online at <https://www.slideshare.net/supergirlanchal/energy-systems-electricity-and-fire-safety>, 41 pages.
(Continued)

*Primary Examiner* — Franklin D Balseca

(57) ABSTRACT

A metering device and method for assessing an incident detected by a safety monitoring system at a physical site at which the metering device is located, the method including: receiving at the metering device sensor layout information for safety monitoring system sensors, receiving a notification from the safety monitoring system including sensor data, determining an incident type and severity index(es) based on the sensor layout information and the sensor data, evaluating the severity index(es) against predetermined criteria, and taking an action based on the evaluation. The sensor data may include sensor identification as well as smoke intensities, temperatures, water pressure, and/or flood levels, etc., reported by the sensors. The actions taken may include disconnecting flow at the metering device, sending an instruction message to other metering device(s) to disconnect flow, and/or sending an alarm message to a device associated with a utility provider associated with the metering device.

17 Claims, 7 Drawing Sheets

(51) Int. Cl.
*G01D 21/00* (2006.01)
*G06Q 50/06* (2012.01)
*H04L 29/08* (2006.01)
*H04Q 9/00* (2006.01)

(52) U.S. Cl.
CPC ............ *H04L 67/125* (2013.01); *H04Q 9/00* (2013.01); *H04Q 2209/00* (2013.01); *H04Q 2209/40* (2013.01); *H04Q 2209/60* (2013.01); *H04Q 2209/80* (2013.01); *H04Q 2209/82* (2013.01); *H04Q 2209/823* (2013.01)

(58) Field of Classification Search
CPC ........... H04Q 2209/00; H04Q 2209/10; H04Q 2209/20; H04Q 2209/40; H04Q 2209/60; H04Q 2209/80; H04Q 2209/82; H04Q 2209/823
See application file for complete search history.

(56) References Cited

U.S. PATENT DOCUMENTS

| | | | |
|---|---|---|---|
| 2012/0112901 | A1 | 5/2012 | Chasko |
| 2019/0025150 | A1* | 1/2019 | Picardi ................ G05B 19/042 |
| 2019/0234786 | A1* | 8/2019 | Klicpera ............... G01F 15/063 |

OTHER PUBLICATIONS

Manual of Design and Specification Standards, Division 16—Electrical, Section 16720—Fire Alarm Systems, University of Arizona, Mar. 2004, found online at <https://pdc.arizona.edu/dssarchive/rev4/16720.pdf>, obtained from the Internet on Nov. 28, 2018, 3 pages.

Anwar et al., "Network-Based Real-time Integrated Fire Detection and Alarm (FDA) System with Building Automation," 6th International Conference on Mechatronics, ICOM'17, IOP Conf. Series: Materials Science and Engineering, vol. 260, paper No. 012025, Aug. 8-9, 2017, Kuala Lumpur, Malaysia, IOP Publishing Ltd., found online at <http://iopscience.iop.org/article/10.1088/1757-899X/260/1/012025/meta>, 16 pages.

Artim, Emergency Management, "3.2 An Introduction to Fire Detection, Alarm, and Automatic Fire Sprinklers," Northeast Document Conservation Center (NEDCC), date unknown, found online at <https://www.nedcc.org/free-resources/preservation-leaflets/3.-emergency-management/3.2-an-introduction-to-fire-detection,-alarm,-and-automatic-fire-sprinklers>, obtained from the Internet on Nov. 28, 2018, 26 pages.

Hopf, "Totally Integrated Power—Application Models for the Power Distribution—High-rise Buildings," Siemens AG, copyright 2012, Publicis Publishing, Erlangen, Germany, found online at <https://www.siemens.com/content/dam/webassetpool/mam/tag-siemens-com/smdb/energy-management/services-power-transmission-power-distribution-smart-grid/consulting/tip-planungshandb%C3%BCcher/application-model-for-high-rise-buildings.pdf>, obtained from the Internet on Nov. 28, 2018, 96 pages.

Kapis et al., "Integration: Building Automation and Fire Alarms," Insights, Schneider Electric US, date unknown, found online at <https://www.schneider-electric.us/en/work/insights/integration-building-automation-and-fire-alarms.jsp>, obtained from the Internet on Nov. 28, 2018, 9 pages.

Mar et al., "Integrating BAS, Electrical Systems," Insights, Schneider Electric UK, date unknown, found online at <https://www.schneider-electric.co.uk/en/work/insights/integrating-bas-electrical-systems.jsp>, obtained from the Internet on Nov. 28, 2018, 9 pages.

PCT International Search Report and Written Opinion dated Feb. 19, 2020, for PCT Application No. PCT/US2019/063002, 14 pages.

* cited by examiner

METERING SYSTEM RESPONSE BASED ON INCIDENT-RELATED NOTIFICATION FROM THIRD PARTY SYSTEM

FIELD OF THE DISCLOSURE

This disclosure relates generally to metering system communications, and more particularly to incident-related communications and metering system response to same.

BACKGROUND

Many physical establishments (businesses, office buildings, factories, manufacturing plants, hotels, apartment complexes, shopping malls, schools, dormitories, homes, etc.) are serviced by one or more utility companies that have implemented one or more advanced metering infrastructures (AMIs) to provide utilities such as, for example, electricity, gas, water, etc. Many of these physical establishments are also serviced by a safety monitoring system such as a fire monitoring system or another safety or security system that may monitor for any number of threats, including fire and smoke, as well as other threats such as flooding, building breaches (e.g., break-ins, broken door/window locks, burglary, theft, etc.), toxicity (e.g., fumes, toxic gases, chemical spills, etc.), etc. It is possible that at least some of these threats at a given location may affect the condition and/or operation of metering devices and/or other equipment/accessories associated with the AMI(s) that may be implemented at that location. It is also possible that some of these threats may cause one or more additional catastrophes that could otherwise be prevented if the metering devices at the location and/or their associated utility services had been alerted in time. For example, if a flood occurs or if a fire breaks out, it may be crucial to cut off flow of electricity and/or gas in one or more areas of the physical establishment (e.g., to prevent short circuits or electrocution of anyone in the vicinity; to prevent further damage to property, appliances, or equipment; to prevent an explosion, etc.). Similarly, a flammable gas released in the area may cause a dangerous situation if electricity is not turned off. A caustic substance that comes in contact with metering equipment may affect metering operation or the condition of such equipment. Currently, there is no immediate reporting of such incidents to a utility service so that preventative actions may be extemporaneously taken to prevent additional loss or harm.

Figure 1:
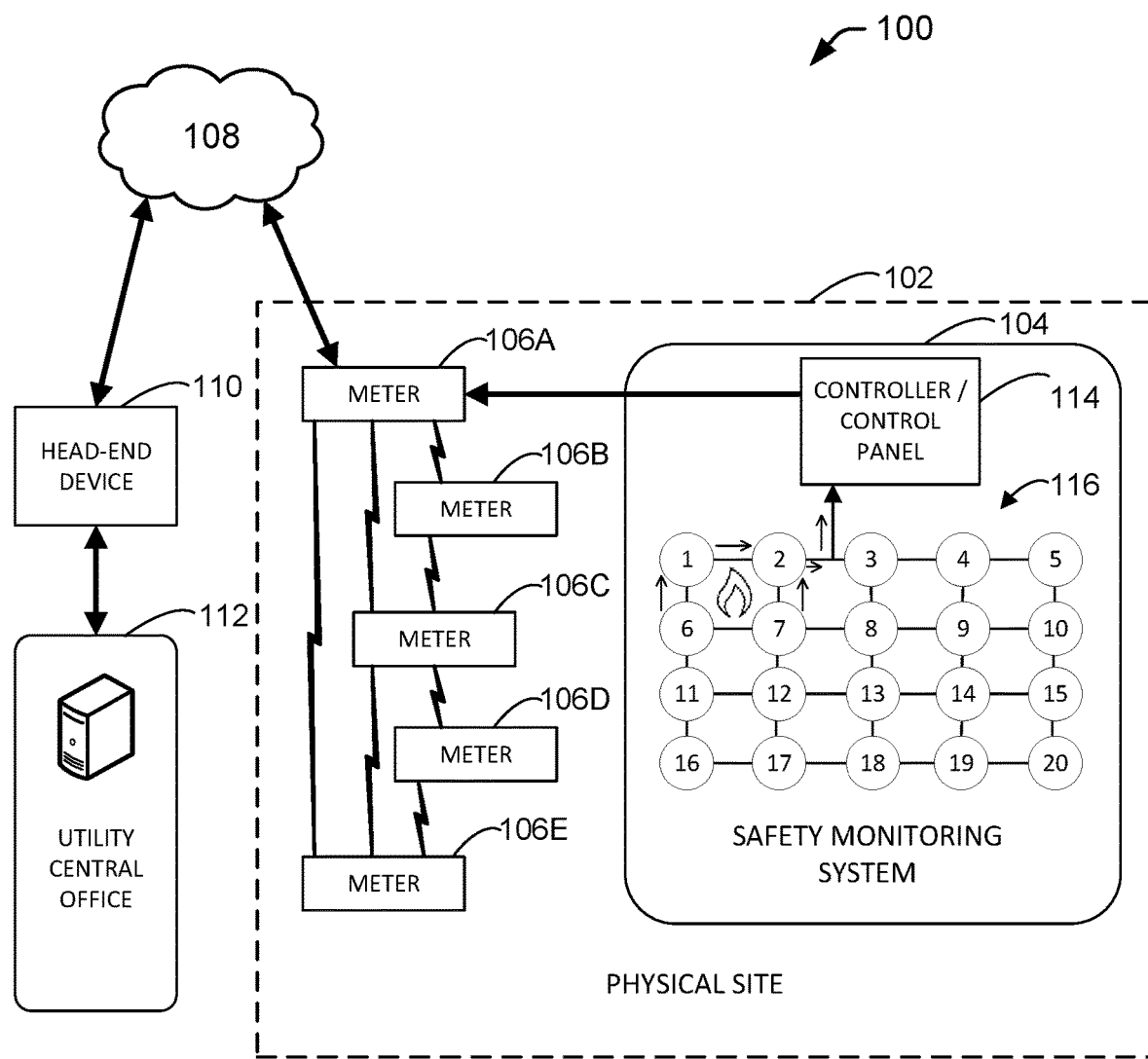
FIG. 1 is a block diagram of an example metering system implemented at a physical site monitored by a safety monitoring system, according to an embodiment of the present disclosure.

In the drawings, the leftmost digit(s) of a reference number may identify the drawing in which the reference number first appears.

DETAILED DESCRIPTION

The description herein discloses a communication approach, as part of an infrastructure of a building or building complex, that would allow a utility metering device to receive incident-related alerts from a third-party monitoring system co-located with the metering device at the building or complex, and to react to the alerts in an expedient manner such that any further danger, property damage, etc., may be avoided. The utility metering device may automatically issue instructions for itself or other utility metering devices to take one or more actions (e.g., to disconnect or halt flow), and/or may send alert information to an associated head-end device (e.g., associated with, or at, a utility office) to determine action(s) (initial or additional) to be carried out. As described in more detail below, providing these communications will allow for a more immediate response in potentially dangerous and/or destructive situations. In addition to immediate (possibly even emergency) response, the utility service can also be promptly informed that associated metering devices and other equipment may require servicing or replacement due to potential damage, and technicians may be scheduled in a more timely manner than they would be if this system was not in place.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that the technology disclosed herein can also be employed in a variety of other systems and applications other than what is described herein.

FIG. 1 depicts an example metering system 100 implemented at a physical site 102 that is monitored by a safety monitoring system 104, according to an embodiment of the present disclosure. Physical site 102 may include any physical establishment, building, or complex, including but not limited to, for example, businesses, office buildings, factories or manufacturing plants, hotels, apartment complexes, shopping malls, schools, dormitories, homes, etc. Physical site 102 may be provided with one or more utilities (e.g., electricity, gas, water, etc.) from one or more utility providers. The usage, or flow, of utilities may be measured at physical site 102 via one or more metering devices placed at physical site 102, the metering devices associated with one or more utility providers. In the example in FIG. 1, example metering devices 106A-E (collectively, metering devices 106) are shown. Metering devices 106 may be networked for communication with each other and (via a network 108)

with an associated utility head-end device 110 and/or central office device(s) 112. For example, metering devices 106 may be electricity meters associated with an electric company, may be gas meters associated with a gas company, and/or may be water meters associated with a water provider. In the example shown, there are multiple metering devices 106, which may be the case with a large building or complex such as a shopping mall, apartment complex, etc., that may have multiple units, where there may be one metering device (per utility type) per unit. Metering devices 106 may be networked together in any of a number of different network configurations (e.g., mesh, star, etc.) and may communicate in any of a number of different ways (e.g., radio frequency (RF) communications, cellular communications, etc.), as discussed below with reference to FIG. 4. Metering devices 106, head-end device 110 and central office device(s) 112 may be part of a larger advanced communication system (e.g., an advanced meter reading (AMR) network or an advanced metering infrastructure (AMI) network, of a utility related implementation).

One or more of metering devices 106 (e.g., metering device 106A) may act as a data collector that may send and/or receive data or other communications to and/or from metering devices 106B-106E. Collected data may be provided to head-end device 110 (which may be located at the central office or elsewhere). In an AMR or AMI network, data collector 106A may collect data from metering devices 106B-106E that may include consumption data or other information associated with a utility meter. Additionally, data collector 106A may send software updates, firmware updates, instructions or other information (which may have been communicated to data collector 106A from head-end device 110 and/or central office device 112, for example) to one or more of the metering devices 106B-106E.

Physical site 102 may be monitored by safety monitoring system 104. Safety monitoring system 104 may be a fire monitoring system or another safety and/or security system that may monitor for any number of threats, including fire, smoke, and/or other threats such as earthquakes, flooding, building breaches, toxicity, etc. Safety monitoring system 104 may include a controller or control panel 114 and one or more sensors 116 located throughout physical site 102 that may communicate with controller/control panel 114. Sensors 116 may be networked together and/or may directly communicate with controller/control panel 114. In the example shown in FIG. 1, safety monitoring system 104 includes twenty sensors 116 that are networked together in a mesh pattern for communication purposes. Communication between sensors 116 and controller/control panel 114 may be through any wired or wireless communications (e.g., RF, cellular, Bluetooth, Wi-Fi, etc.), as would be understood by one of ordinary skill in the relevant art.

Upon detection of an incident (e.g., a beyond-threshold reading of temperature, smoke, fumes, chemicals, humidity, water level, seismic activity, etc., as defined by safety monitoring system 104) at one or more of sensors 116, an incident message may be sent by the one or more sensors 116 to controller/control panel 114. In the example shown in FIG. 1, an abnormally high temperature (e.g., a fire) may be detected by one or more of sensors 1, 2, 5, or 7, and an incident message may be sent to controller/control panel 114 by one or more of sensors 1, 2, 5, or 7. In the example, the incident message is sent through neighboring sensors 1, 2, 5, and 7, as shown by the small arrows leading from sensors 1, 2, 5, and 7 toward controller/control panel 114; however, other communication paths may be followed, including via other sensors 116 or via direct communications between an individual sensor and controller/control panel 114.

Controller/control panel 114 may receive an incident message and respond however safety monitoring system 104 is configured to respond for a particular incident (e.g., sending an alert message to building management systems, shutting down any manufacturing or other processes that may be occurring at the site, triggering the closing of one or more doors to prevent fire from spreading or smoke/fumes from infiltrating throughout the building, starting a sprinkler system in the area of the fire, alerting a local fire department, etc.). In addition to this response, controller/control panel 114 may send a notification message regarding the incident to one or more metering devices 106 (e.g., directly from controller/control panel 114, or via safety monitoring system 104, or via another system (e.g., a site management system (not shown)) that receives the notification message from the safety monitoring system and forwards it to the one or more metering devices 106). In the example shown in FIG. 1, controller/control panel 114 is shown sending a notification message to metering device 106A. The notification message may include, for example, sensor data that was collected and or processed by controller/control panel 114, the sensor data including information regarding an anomaly (e.g., an abnormal and/or beyond threshold reading) reported at one or more sensors 116. Examples of such sensor data may include information regarding smoke intensities, temperatures, water pressures, flood levels, fume intensities, toxicity levels, chemical spill amounts or concentrations, seismic measurements, etc. The sensor data may also include information identifying the reporting sensors, and may additionally include sensor layout information (e.g., locations of sensors 116 at physical site 102). Alternatively, sensor layout information may have been previously provided to one or more metering devices 106, including metering device 106A (e.g., by controller/control panel 114 or from a separate upload/download (e.g., via head-end device 110)). Sensor layout information may include such information as sensor identifications, sensor locations, distances between sensors, total area covered by the sensors, etc. The notification message may also include information regarding what action is being taken by the safety monitoring system (e.g., shutting down any manufacturing or other processes that may be occurring at the site, triggering the closing of one or more doors to prevent fire from spreading or smoke/fumes from infiltrating throughout the building or excessive flooding, starting a sprinkler system in the area of the fire, alerting a local fire department, etc.), which may be a helpful indication of the severity of the situation (and may be helpful in determining one or more severity indexes described further below).

Metering device 106A may determine an incident type (e.g., smoke, fire, flood, chemical spill, fumes, earthquake, etc.) based on the received sensor data, or alternatively, the incident type may be provided in the notification message received from controller/control panel 114. Metering device 106A may determine one or more incident locations based on the sensor data and sensor layout information (or the incident location(s) may have been provided in the notification message to metering device 106A). Metering device 106A may determine, or assign, a severity index, or severity indexes, based on the received sensor data and sensor layout information. Severity index(es) may be determined using one or more algorithms specially developed, and/or may also be customizable, depending on the specific nature and needs of the physical site and/or of the utility meter installation at the physical site. The algorithm(s) may take into account the sensor data and other information it has or obtains from safety monitoring system 104 and may compare it against predetermined thresholds (e.g., flood depth thresholds, humidity thresholds, smoke intensity thresholds, temperature thresholds, distance (e.g., incident to meter) thresholds, fume intensity thresholds, chemical amount thresholds, chemical concentration thresholds, seismic activity thresholds, etc.). As would be understood by those of ordinary skill in the relevant art, there are countless ways to determine and use a severity index, therefore only a few examples will be described herein, simplified for understanding.

In an embodiment, a severity index may be a single indicator (e.g., a designated number, such as 1 to X, with X being the most severe) that may represent a level of severity and/or may indicate a response instruction. This type of severity index may be determined by comparing the received sensor data (and optionally the incident type and/or the sensor layout information) against predetermined criteria, and using an algorithm to determine, or assign, a single severity index value. In a single indicator example, a fire may be assigned, for example, a severity index of "5" (i.e., a high severity, which may require an action response such as disconnection of a resource for safety), while a low smoke intensity or fume with low toxicity level/concentration may be assigned, for example, a severity index of "2" (i.e., a lower severity, which may prompt a less extreme action response such as a subsequent visit from a utility technician to ensure the metering devices/systems are not damaged, etc.). In an embodiment, the severity index may be taken into account when determining what action is needed. In another embodiment, the severity index may itself indicate what action is needed. (In the above example, a 5 may indicate a full disconnection of resources is warranted, with shut-down of one or more metering device(s) if needed, a 4 may indicate a full disconnection of resources is warranted (with metering devices left on), a 3 may indicate a partial disconnection of resources is warranted, a 2 may indicate a visit from a utility technician is recommended, and a 1 may indicate no imminent threat but monitoring recommended (e.g., an alert for information only).) While a severity scale of 1 to 5 may be used in the example above and other examples herein, it is an example scale used for ease of understanding. Any other situation-appropriate scale or code may be used, as would be understood by those of skill in the relevant art. In an embodiment, a single indicator severity index may be representative of a combination of incident types. In another embodiment, more than one single indicator severity index may be determined for each of more than one incident type (one for a fire, one for a flood, etc.).

In an embodiment, a single indicator severity index may be determined based on the number of sensors reporting an anomaly. In an example where there may be 20 sensors installed in a building, if only 1-3 sensors are reporting an anomaly, severity index of 3 or less may be determined. If 4-9 sensors are reporting an anomaly, a severity index of 4-7 may be determined. If 10 or more sensors are reporting an anomaly, a severity index of 8 or greater may be determined. Where the determined severity index falls in these ranges may further depend on other information that may be provided by the sensors and/or the safety monitoring system (e.g., affected area(s) of the building, locations of the sensors, distances between the sensors, detected temperatures, and/or any other data or information that the sensors may provide).

In an embodiment, a severity index may include a set of indicators rather than a single indicator. The set of indicators may, for example, provide an indicator for each type of incident that may occur at a physical site, determined based on the sensor data/locations (e.g., by an appropriate algorithm or algorithms for the site properties/needs). This multi-indicator severity index may be formatted as, for example, {[fire], [smoke], [high temperature], [low temperature], [chemical spill amount/concentration], [toxicity level], [flood], [earthquake or seismic activity/measurement]}. Using this example set, if an explosion occurred at a site that caused a fire, smoke, and a chemical spill, a determined severity index may look like this: {5, 5, 5, 0, 4, 3, 1, 0}, which may indicate high severities (denoted by 5) for fire, smoke, and high temperature, a somewhat high severity (denoted by 4) for the chemical spill, a severity level of zero for low temperature (i.e., no severity (or threat) of an extreme cold temperature), a moderate severity (denoted by 3) of toxicity level (e.g., perhaps the toxicity level is not very high for the type of chemical spilled), a low severity (denoted by 1) for flood (e.g., perhaps sprinklers have gone off such that humidity has gone up, but water levels are not very high), and severity level of zero for an earthquake. An algorithm may then be used to determine, based on the combination of severity levels, what action(s) should be taken, as discussed further below. While a severity scale of 1 to 5 may be used in the example above and other examples herein, it is an example scale used for ease of understanding. Any other situation-appropriate scale or code may be used, as would be understood by those of skill in the relevant art. Note that the indicators of 1 to 5 in this example may not necessarily correlate with a specific predefined action or actions as in the single indicator example discussed earlier. In another embodiment, a multi-indicator severity index may simply include a formatted set of the sensor data (e.g., {[flood depth], {[water pressure], [humidity], [smoke intensity], [temperature], [distance] (e.g., incident to meter(s)), [fume intensity], [chemical amount], [chemical concentration], [seismic measurement]}).

Once the one or more severity indexes are determined, metering device 106A may evaluate the severity index(es) against predetermined criteria depending on the type of severity index(es) used, and then take one or more actions based on the evaluation. For example, in the case of a single severity indicator discussed above, metering device 106A may compare the determined severity index to a predetermined instruction indicator. In the relevant example above, where the severity index may range from 1 to 5, with 5 being most severe, a 5 may indicate that a full disconnection of resources is warranted, with shut-down of one or more metering device(s) if needed, a 4 may indicate that a full disconnection of resources is warranted (with metering devices left on), a 3 may indicate that a partial disconnection of resources is warranted, a 2 may indicate that a visit from a utility technician is recommended, and a 1 may indicate that there is no imminent threat but monitoring is recommended (e.g., an alert for information only). These example instruction indicators are just examples of instruction indicators and instructions that may be used. Any number of severity indexes/instruction indicators may be used, and the instructions may be any instructions that are appropriate for any incident that may occur at the physical site.

In the case of a multi-indicator severity index set discussed above with severity indicators on a scale (e.g., such as from 1 to 5), metering device 106A may compare the determined severity index set to predetermined action indicator sets. Put in a different way, a determined severity index set may be evaluated (e.g., via an algorithm) against defined action indicator sets that may direct metering device 106A to a specific course of action. As an example, an algorithm may be executed such that if any of certain indicators (e.g., indicators for more dangerous situations such as fire, high temperature, or flood) are set to 5 (a highest defined severity level), then metering device 106A may direct a full disconnection of resources and optionally shut-down of one or more metering devices if needed (e.g., for safety reasons). In the example discussed above, where a severity index set represented by {[fire], [smoke], [high temperature], [low temperature], [chemical spill amount/concentration], [toxicity level], [flood]} is determined to be {5, 5, 5, 0, 4, 3, 1}, metering device 106A may (due to at least the assignments of "5" for fire and high temperature) direct a full disconnection of resources and optionally shut-down of one or more metering devices if needed. In another example, if the severity index set is determined to be {0, 0, 0, 0, 2, 1, 0} due to, for example, a barrel of a chemical substance of low toxicity that fell off a warehouse shelf and broke, the metering device 106A may be directed to report the incident to head-end device 110 and/or central office device(s) 112, but take no further action.

In the case of a multi-indicator severity index set that includes a formatted set of the sensor data (e.g., {[flood depth], {[water pressure], [humidity], [smoke intensity], [temperature], [distance] (e.g., incident to meter(s)), [fume intensity], [chemical amount], [chemical concentration]}), the evaluation may be comparisons of these values against predetermined thresholds such as flood depth thresholds, water pressure thresholds, humidity thresholds, smoke intensity thresholds, temperature thresholds, distance (e.g., incident to meter(s)) thresholds, fume intensity thresholds, chemical amount thresholds, chemical concentration thresholds, seismic measurement thresholds, etc. As an example, if the severity index set is formatted as $\{1.0, 0, 80, 5\times10^9, 498, 3.1, 0, 0, 0, 0\}$, indicating 1 cm of water (possibly from a sprinkler douse), a humidity of 80% (again, possibly due to sprinkler use), a smoke intensity/concentration of $5\times10^9$ particles per cubic cm, a temperature of 498 degrees Celsius (a fairly high temperature that may indicate a fire), and a distance of 3.1 meters away from one or more metering devices, metering device 106A may direct a full disconnection of resources (and optionally shut-down of one or more metering devices, if needed) due to the fire properties based on the combination of beyond threshold values present in the severity index set. With either type of multi-indicator severity index set, any number of index combinations may be set for evaluation in the algorithm, depending on the scenario possibilities at a particular physical site.

In short, metering device 106A may determine one or more severity indexes that indicate a situation (e.g., fire, flood, spill, earthquake, etc.) that may cause a resource supply (e.g., electricity, gas, etc.) to be potentially dangerous to life or property. (For example, a fire near a gas meter or gas line may cause an explosion, or a fire to be put out by water or a flood near an electricity meter or electricity source may cause a short or electrocution.) Based on evaluation of the one or more indexes (and optionally other data, such as incident location(s), meter locations, etc.), metering device 106A may take one or more actions. For example, metering device 106A may take an action such as sending an instruction to one or more other metering devices 106, one or more transformers or substations (or load control switch) in the resource distribution system, and/or head-end device 110 or central office device(s) 112 of a utility provider (e.g., the utility provider associated with metering device 106A), to disconnect flow to one or more areas at physical site 102 and/or surrounding areas that may be affected. Metering device 106A may also disconnect flow at itself if in accordance with its own capabilities. In another example (in addition to or instead of the previous example), metering device 106A may take an action such as sending an instruction to one or more other metering devices 106 to shut down (e.g., to conserve battery power or otherwise protect or preserve the life of the metering device). Similarly, metering device 106A may also shut down itself. In yet another example (in addition to or instead of the previous examples), metering device 106A may take an action such as sending an alarm message regarding the incident to head-end device 110 and/or central office device(s) 112. The alarm message may include one or more of: incident type, incident location(s), the determined severity index(es), the sensor data, the sensor layout information, and/or information regarding what action the safety monitoring system is taking and/or what action metering device 106 has taken in response to the incident.

Figure 2A:
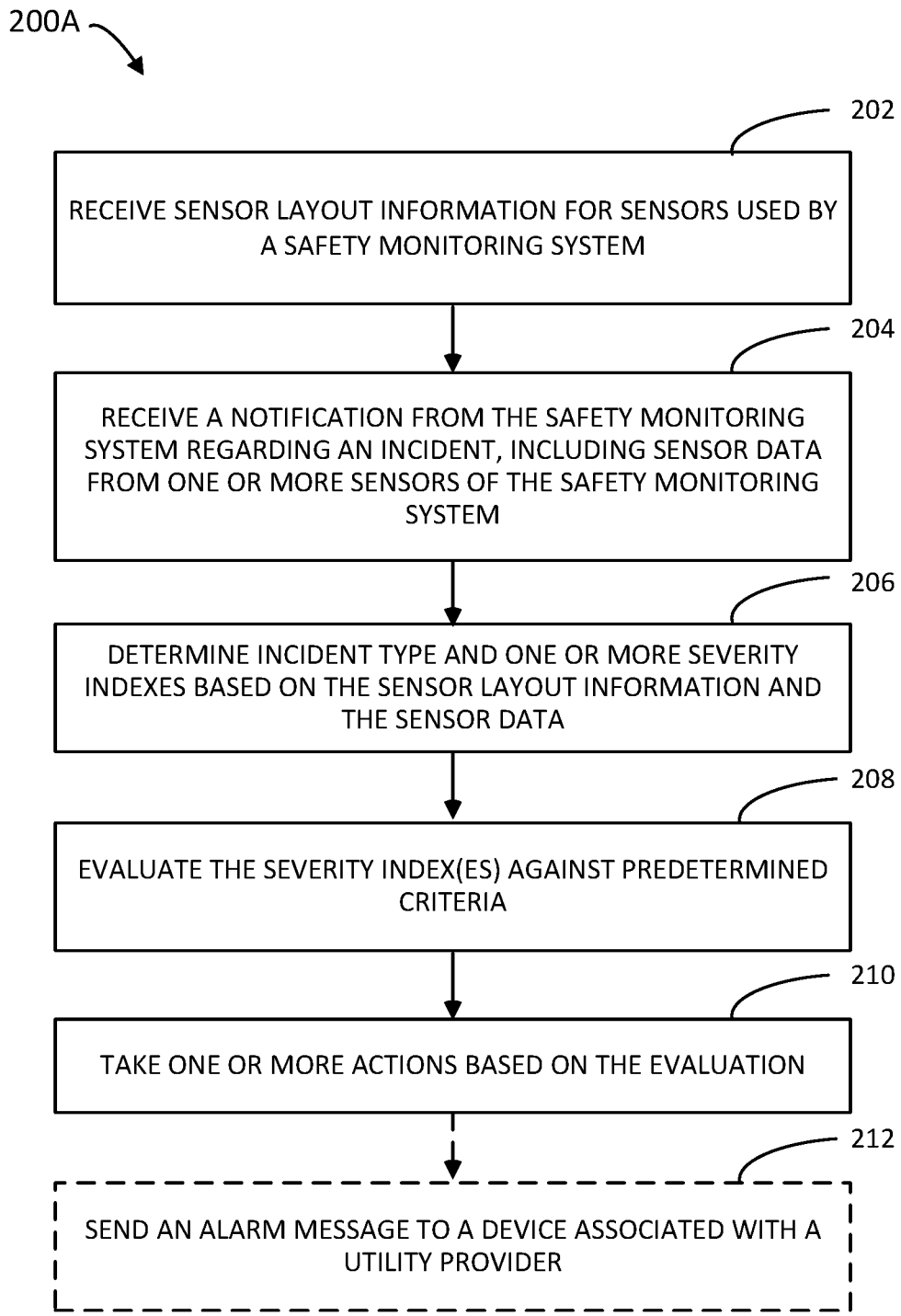
FIG. 2A and FIG. 2B are flow diagrams illustrating examples of a metering system response to an incident-related message of a safety monitoring system, from the perspective of a metering device, according to embodiments of the present disclosure.
Figure 2B:
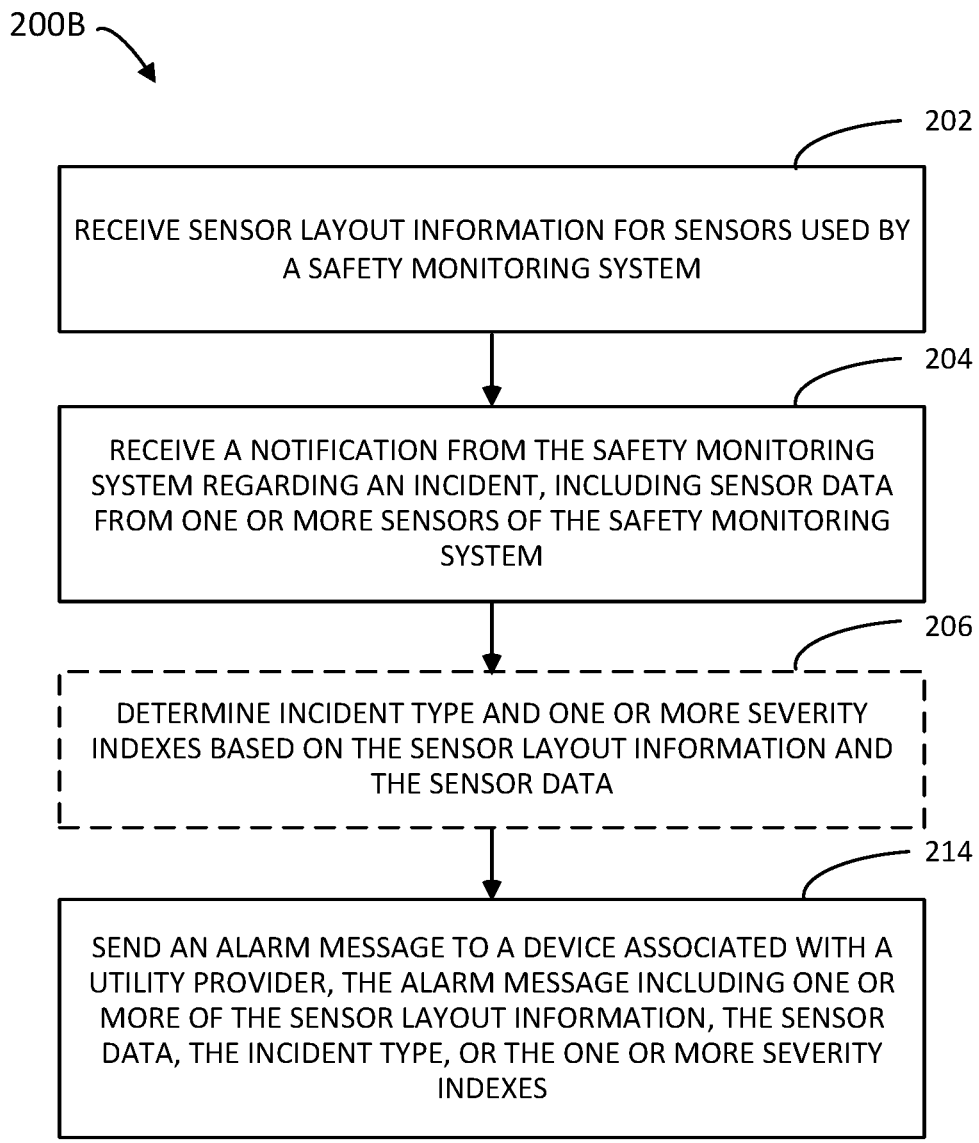

FIG. 2A and FIG. 2B are flow diagrams illustrating examples of a metering system response to an incident-related message of a safety monitoring system (e.g., safety monitoring system 104), from the perspective of a metering device (e.g., any of metering devices 106), according to embodiments of the present disclosure. In an embodiment shown in FIG. 2A, flow diagram 200A is, in short, a concise summary of the above discussion. At 202, sensor layout information may be received by the metering device for sensors used by the safety monitoring system. At 204, a notification of an incident from the safety monitoring system may be received by the metering device. The notification may include sensor data from one or more of the sensors of the safety monitoring system. The sensor layout information of 202 may be included in the notification or may have been provided (e.g., sent or uploaded) to the metering device previously. At 206, an incident type and one or more severity indexes may be determined based on the sensor layout information and the sensor data. In an embodiment, the incident type may be provided to the metering device in the notification from the safety monitoring system. At 208, the severity index(es) may be evaluated against predetermined criteria, as discussed above. At 210, the metering device may take one or more actions based on the evaluation, also discussed above. As discussed above, the action taken may include sending an alarm message to a head-end device, or another device, associated with a utility provider (e.g., the utility provider associated with the metering device). In an optional embodiment, at 212, an alarm message may be sent to a head-end device, or another device, associated with a utility provider in addition to other actions taken by the metering device.

In an embodiment shown in FIG. 2B, flow diagram 200B includes blocks 202 and 204 (and optionally block 206) from FIG. 2A, but instead of evaluating severity index(es) (if determined) and taking an action based on the evaluation, the metering device (at 214) may send the sensor layout information, the sensor data, and/or the incident type and/or severity index(es), if determined, in an alarm message to the head-end device, or another device, associated with the utility provider. The head-end device, or the device associated with the utility provider, may determine the incident type and/or the severity index(es) (e.g., if not provided in the alarm message already) and may evaluate the severity index(es) against predetermined criteria and take one or more actions based on the evaluation, similar to the activities of the metering device in blocks 206, 208, and/or 210 in FIG. 2A. The alarm response from the perspective of the head-end device, or another device associated with the utility provider, is discussed with reference to FIG. 3.

Figure 3:
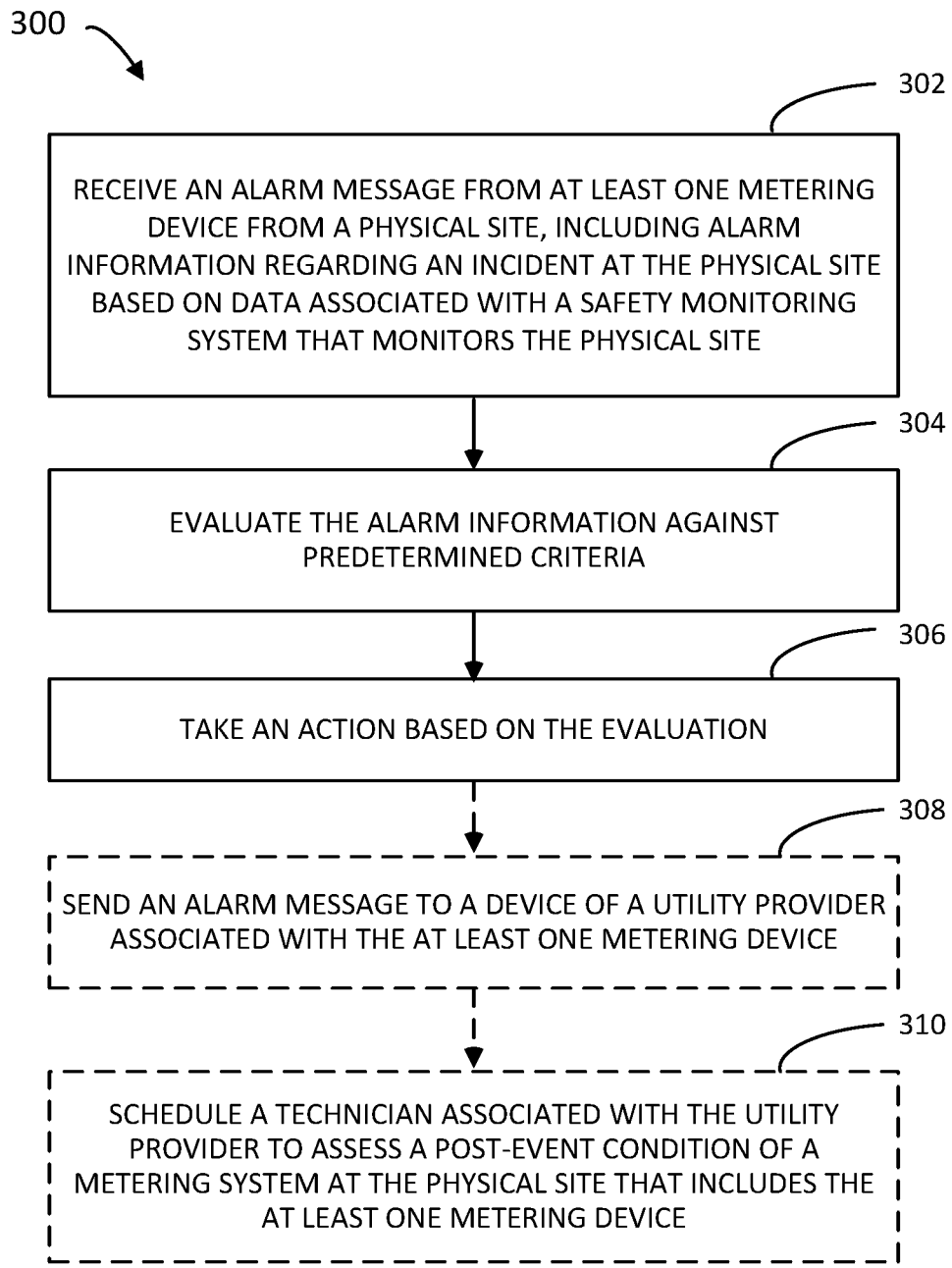
FIG. 3 is a flow diagram illustrating an example of a metering system response to an incident-related message of a safety monitoring system at a physical site, from the perspective of a head-end device in communication with a metering device at the physical site, according to embodiments of the present disclosure.

FIG. 3 is a flow diagram 300 illustrating an example of a metering system response to an incident-related message of a safety monitoring system at a physical site, this time from the perspective of a head-end device (e.g., head-end device 110), or other device associated with a utility (e.g., central office device 112) that is in communication with a metering device at the physical site, according to embodiments of the present disclosure. At 302, an alarm message is received from at least one metering device (e.g., metering device(s) 106) that are located at a physical site. The alarm message may include information regarding an incident at the physical site (e.g., fire, smoke, chemical spill, fumes, flood, etc., as discussed previously herein) that is based on data (e.g., sensor data, as discussed previously herein) associated with a safety monitoring system (e.g., safety monitoring system 104) that monitors the physical site. An incident type and/or location may have been included with the alarm message information, or may be determined by the head-end device using other information in the alarm message. At 304, the alarm information may be evaluated against predetermined criteria, and at 306, an action may be taken (if not already taken by one of metering devices 106) based on the evaluation (e.g., sending an instruction (to one or more meters, transformers, substations, load control switches, etc.) to disconnect flow to the physical site or to one or more areas at or nearby the physical site, sending an instruction to one or more of the metering devices at the physical site to power down, scheduling a technician to conduct a check of the metering system at the physical site in case of damage, etc.).

In an embodiment, the alarm information provided to the head-end device (or central utility device) in the alarm message may simply be a notification informing the head-end device of the incident, and may include what action or actions (e.g., disconnections, etc.) may have already been taken by one or more metering devices 106 at the physical site. The action or actions, if any, then taken by the head-end device in response to the notification may include: forwarding the notification to a device at the utility central office (e.g., if the head-end device is not already located there), scheduling a technician to conduct a check of the metering system at the physical site in case of damage, etc. The notification may contain a determined severity index (or indexes), as previously described above, and the action(s) taken may depend on an evaluation of the severity index(es) (e.g., if the severity index is such that the metering device(s) at the physical site are not likely to have been harmed, then it may not be necessary to schedule a visit by a technician).

In an embodiment, metering device(s) 106 may simply provide information to the head-end device (or central utility device), and the head-end device may make decisions and take actions (e.g., via one or more algorithms) based on the provided information. For example, the alarm information provided to the head-end device in the alarm message may include a determined severity index or indexes (or may include the sensor data and/or sensor layout information from the safety monitoring system from which the head-end device may determine the severity index(es)), compare the severity index(es) to predetermined criteria, and take one or more action(s) based on those comparisons.

In an embodiment where a single indicator severity index (e.g., an index of 1 to X, with X being the most severe, previously described above) is provided to (or determined by) the head-end device (or central utility device), the head-end device may compare the severity index to a predetermined instruction indicator, and then take one or more actions depending on the indicated level of severity. The evaluation of the severity index and the action(s) taken would be similar to as described above in which a metering device evaluates this type of severity index and takes action(s).

In an embodiment where a multi-indicator severity index with a set of scale indicators (e.g., indexes of 1 to X, with X being the most severe, for various factors or incident types (e.g., fire, temperature, smoke intensity, humidity, water pressure, flood level, fume intensity, chemical concentration, toxicity level, seismic activity, etc.) is provided to (or determined by) the head-end device (or central utility device), the head-end device may compare the severity indexes to predetermined sets of instruction indicators, and then take one or more actions depending on the particular combination of indexes for the situation. The evaluation of the severity indexes and the action(s) taken would be similar to as described above in which a metering device evaluates this type of severity index set and takes action(s).

In an embodiment where a multi-indicator severity index with a formatted set of sensor data (e.g., {[flood depth], [water pressure], [humidity], [smoke intensity], [temperature], [distance] (e.g., incident to meter(s)), [fume intensity], [chemical amount], [chemical concentration], [seismic measurement]}) is provided to (or determined by) the head-end device (or central utility device), the head-end device may compare the severity indexes/indicators to predetermined thresholds (e.g., flood depth thresholds, water pressure thresholds, humidity thresholds, smoke intensity thresholds, temperature thresholds, distance (e.g., incident to meter(s)) thresholds, fume intensity thresholds, chemical amount thresholds, chemical concentration thresholds, seismic measurement thresholds, etc.), and then take one or more actions depending on the particular combination of indexes for the situation. The evaluation of the severity indexes/indicators and the action(s) taken would be similar to as described above in which a metering device evaluates this type of severity index set and takes action(s).

If the head-end device is a field device or is not located at the central utility office location (e.g., mobile data collection device 430 of FIG. 4 described below), optionally, at 308, an additional alarm message to a device at the central utility office location may be sent. The additional alarm message may be identical to the alarm message sent to the head-end device by a metering device 106, or may be different (e.g., it may provide information regarding the incident and what was done in response to it for informational or historical purposes). At 310, a technician may be scheduled to conduct an assessment of a post-event condition of the metering system at the physical site in case of damage. The sending of an alarm message 308 and/or the scheduling of a technician 310 may be done as an action taken at 306 or in addition to any actions taken at 306. In an embodiment, a notification with information regarding the incident may also be sent to an emergency agency (e.g., a fire department), in case any information received or determined via a metering device and/or head-end device may be useful to the emergency agency in understanding the causes/effects of the incident and/or determining any necessary actions to take.

Example Network Environment(s)/Device(s)

Figure 4:
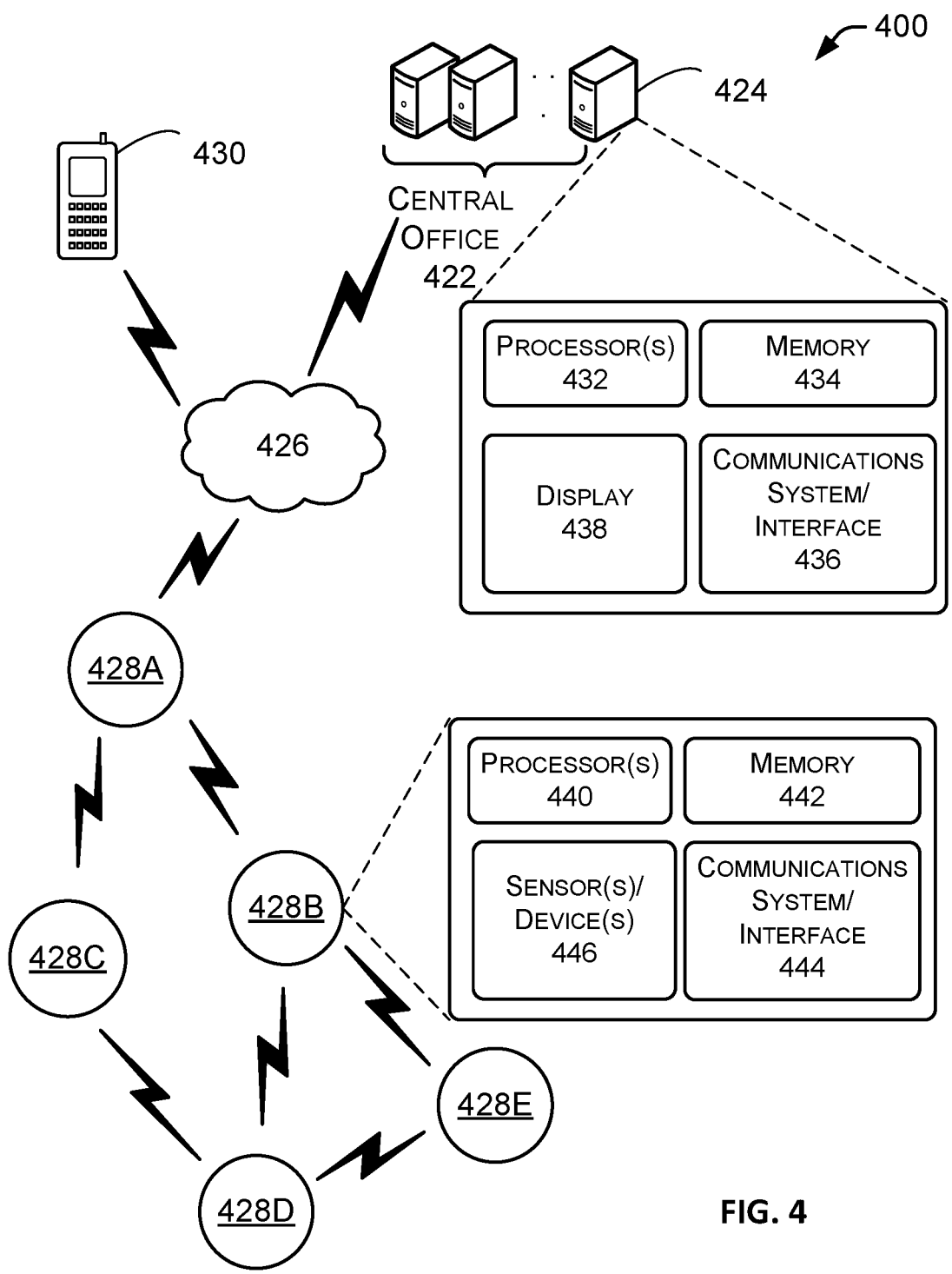
FIG. 4 is an illustration of an example network environment in which example methods, apparatus, and articles of manufacture disclosed herein may be implemented, according to embodiments of the present disclosure.

FIG. 4 is an illustration of an example network environment in which methods, apparatus, and articles of manufacture disclosed herein may be implemented, according to embodiments of the present disclosure. For example, metering devices 106 and/or head-end device 110 and/or a device at utility 112 of FIG. 1 may be a part of an advanced communication system (e.g., an advanced meter reading (AMR) network or an advanced metering infrastructure (AMI) network, of a utility related application), such as data collection network 400 of FIG. 4, according to embodiments. Data collection network 400 may include a central office 422, which may be associated with a data collection/processing entity (e.g., a utility company, in the case of an AMR or AMI network). The central office may include one or more central computing device(s) 424 (e.g., central utility device(s) 112) that may communicate with network nodes through one or more networks 426/108, which may be the Internet or other network having widespread or local functionality. Network nodes may include nodes 428A-428E (collectively, nodes 428), which may include, for example, endpoint devices such as utility meters 106 of FIG. 1 (e.g., gas meters, water meters, electric meters, etc.) or other devices that may comprise sensors, actuators, etc. These nodes may be located at various sites or locations (e.g., homes, businesses, etc.). Nodes 428A-428E may be configured in a mesh network, star network or other configuration. While only five nodes 428 are illustrated for simplicity, there may be any number of network nodes. One or more of the network nodes (e.g., device 428A) may be a data collector and/or concentrator that may be configured for communication (e.g., radio frequency (RF) communication, cellular communication, etc.) with a plurality of downstream nodes 428B-428E, which may also be configured for similar communications. In an example operation, data collector 428A may send and/or receive data or other communications to and/or from nodes 428B-428E to be provided to a data collection device 424, (which may be located at central office 422) and/or a mobile data collection device 430 (e.g., head-end device 110). For example, in an AMR or AMI network, data collector 428A may collect data from nodes 428B-428E that may include consumption data or other information associated with a utility meter (e.g., a gas meter, a water meter, an electricity meter, etc.). Additionally, data collector 428A may send software updates, firmware updates, instructions or other information (which may have been communicated to data collector 428A from data collection device 424 or 430, for example) to one or more of the nodes 428B-428E. In an embodiment, one or more network nodes (e.g., nodes 428A-428E) may be powered by a battery.

In an expanded view, data collection device 424 (and/or mobile data collection device 430) may include, among other components, one or more controllers or processors 432, a memory 434, one or more communication systems and/or interfaces 436 (e.g., configured for RF communications, cellular communications, and/or another type of communications), and optionally a display 438. Nodes 428 may include, among other components, one or more controllers or processors 440, a memory 442, one or more communication systems and/or interfaces 444 (e.g., configured for RF communications, cellular communications, and/or another type of communications), and one or more sensors/devices 446, which may include, for example, one or more measurement sensors or other devices (e.g., meter(s), actuator(s), light(s), etc.).

One or more features disclosed herein may be implemented in hardware, software, firmware, and/or combinations thereof, including discrete and integrated circuit logic, application specific integrated circuit (ASIC) logic, Field-Programmable Gate Array (FPGA) logic, Programmable Logic Controller (PLC) logic, and microcontrollers, and may be implemented as part of a domain-specific integrated circuit package, or a combination of integrated circuit packages. The terms software and firmware, as may be used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, over an electromagnetic wave guide, over a fiber optic cable, through a local or wide area network, through a Personal Area Network (PAN) or a Field Area Network (FAN), or through a network such as the Internet. An example of a non-transitory computer readable medium may be a compact disk, a flash memory, SRAM, DRAM, a hard drive, a solid state drive, or other data storage device.

A processing platform of a data collection device (e.g., data collection device 424 or mobile data collection device 430 of FIG. 4), and/or a node (e.g., any of devices 428) may be embodied in any type of mobile and/or non-mobile computing device. Examples of mobile devices may include, but are not to be limited to, laptop computers, ultra-laptop computers, tablets, touch pads, portable computers, hand-held computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices (e.g., utility meters or other sensors or devices), etc.

Figure 5:
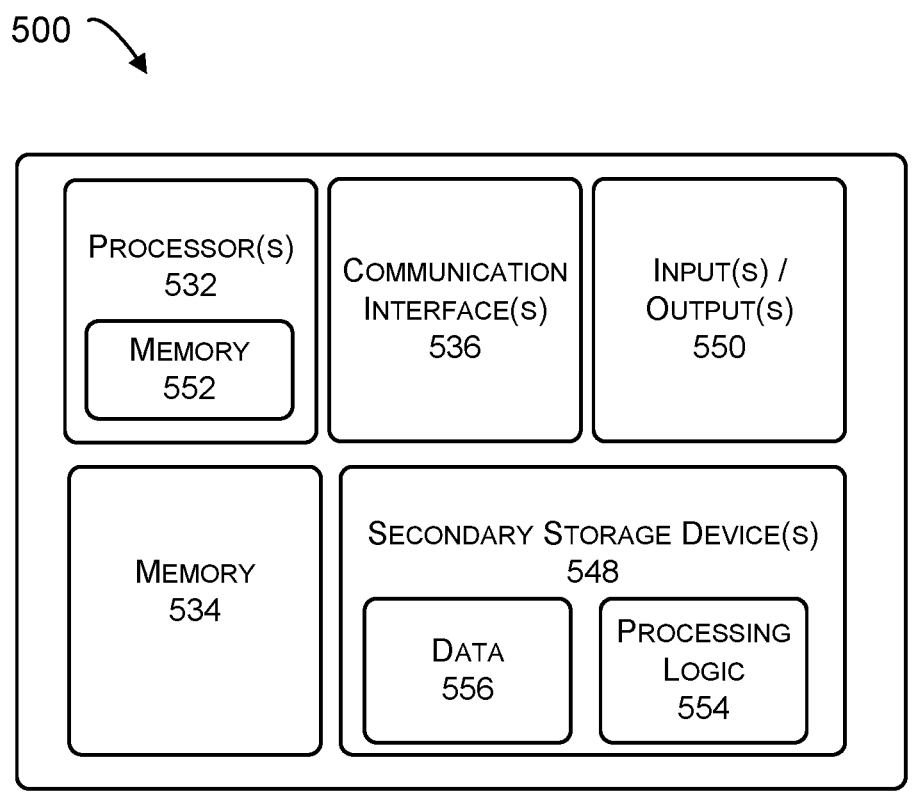
FIG. 5 is a block diagram showing various components of an example data collection device (e.g., device 110 of FIG. 1, or device 424 or 430 of FIG. 4), according to an embodiment of the present disclosure.

FIG. 5 is a block diagram of an example processing platform 500 of a mobile or non-mobile data collection device (e.g., device(s) 110, 112, 424, 430), according to embodiments. Processing platform 500 may include one or more processors 532, memory 534, one or more secondary storage devices 548, one or more input/output ports or devices 550, and/or one or more communication interfaces 536, in communication via a bus, line, or similar implementation (not shown). Processing platform 500 may also include a power supply (not shown), which may include an interface to an electricity source and/or may include one or more batteries.

Processor(s) 532 may be implemented by, for example but not limitation, one or more integrated circuits, ASIC circuits, FPGA circuits, PLC circuits, PLD, circuits, logic circuits, microprocessors, controllers, etc. Processor(s) 532 may include a local memory 552 (e.g., a cache), an arithmetic logic unit (ALU), an internal or external bus controller, an internal register file, a floating point unit, a digital signal processor (DSP), an interrupt controller, or a memory management unit (MMU). Memory 534 may include a volatile and/or a non-volatile memory. Volatile memory may be implemented by Static RAM (SRAM) and/or Dynamic RAM (DRAM) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 534 may be controlled by a memory controller (not shown). Data stored in memory 534 and/or local memory 552 may be used by processor(s) 532 to facilitate data collection functions and/or communications, calculations/computations (e.g., if not done at the node device(s) or elsewhere), etc., according to embodiments of this disclosure.

Input/output port(s)/device(s) 550 may allow a user or an external device to interface with processor(s) 532. Input devices may allow a user to enter data and/or commands for processor(s) 532. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices such as display device 438 of FIG. 4. Examples of other display devices may include a light emitting diode (LED), an organic light emitting diode (OLED), a liquid crystal display, a cathode ray tube display (CRT), a touchscreen, a tactile output device, a printer, speakers, etc. The input/output port(s)/device(s) may be connected to processor(s) 532, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 536 may be implemented in hardware or a combination of hardware and software, and may provide wired or wireless network interface(s) to one or more networks, such as network(s) 426/108. Communication interface(s) 536 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 426/108. In an embodiment, security mechanisms may be used to provide secure communications, as would be understood by one of ordinary skill in the art.

Secondary storage device(s) 548 may store processing logic 554 (e.g., software) to be executed by processor(s) 532, and/or may store data 556. Processing logic 554 and data 556 may be used by processor(s) 532 to facilitate data collection functions and/or communications between devices, calculations/computations (e.g., if not done at the node device(s) or elsewhere), etc., according to embodiments of this disclosure. Processing logic 554 may include algorithms/instructions for executing the methodology described herein, such as data communications/messaging, determining and/or evaluation of sensor data, severity index(es), etc., determining one or more actions to take based on the evaluation(s), and carrying out the action(s). Examples of secondary storage device(s) 548 may include one or more hard drive disks, including but not limited to electro-mechanical hard drives, FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 548.

Figure 6:
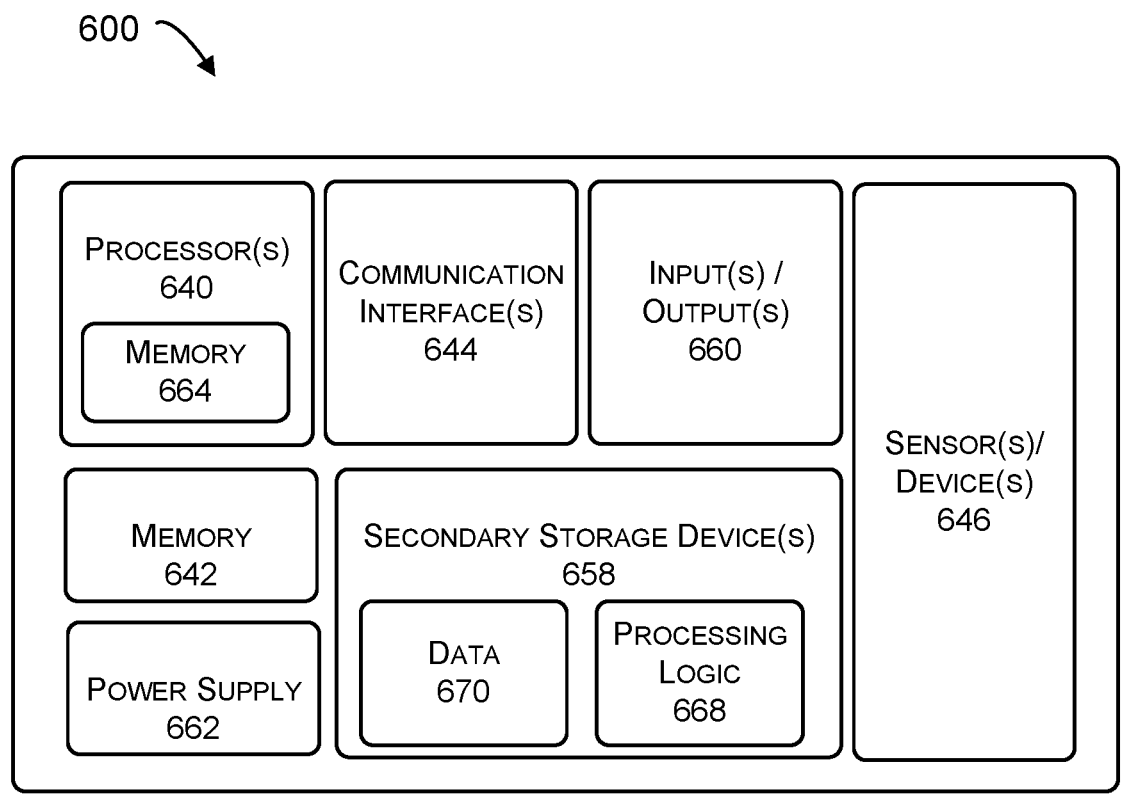
FIG. 6 is a block diagram showing various components of an example network node (e.g., one of meters 106 of FIG. 1 or nodes 428 of FIG. 4), according to an embodiment of the present disclosure.

FIG. 6 is a block diagram of an example processing platform 600 of a node device (e.g., devices 106, nodes 428, etc.), according to embodiments. Processing platform 600 may include one or more processors 640, memory 642, one or more secondary storage devices 658, one or more input/output ports or devices 660, and/or one or more communication interfaces 644, in communication via a bus, line, or similar implementation (not shown). Processing platform 600 may also include a power supply 662, which may include an interface to an electricity source and/or may include one or more batteries. Platform 600 may also include one or more sensors/devices 646, which may include, for example, one or more measurement sensors or other sensors or devices (e.g., meter(s), actuator(s), light(s), etc.).

Processor(s) 640 may be implemented by, for example but not limitation, one or more integrated circuits, ASIC circuits, FPGA circuits, PLC circuits, PLD, circuits, logic circuits, microprocessors, controllers, etc. Processor(s) 640 may include a local memory 664 (e.g., a cache), an arithmetic logic unit (ALU), an internal or external bus controller, an internal register file, a floating point unit, a digital signal processor (DSP), an interrupt controller, or a memory management unit (MMU). Memory 642 may include a volatile and/or a non-volatile memory. Volatile memory may be implemented by Static RAM (SRAM) and/or Dynamic RAM (DRAM) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 642 may be controlled by a memory controller (not shown). Data stored in memory 642 and/or local memory 664 may be used by processor(s) 640 to facilitate data collection functions, calculations/computations, metering functions and/or metering calculations/computations (if embodied in a utility meter), and/or communications, etc., according to embodiments of this disclosure.

Input/output port(s)/device(s) 660 may allow a user or an external device to interface with processor(s) 640. Input devices may allow a user to enter data and/or commands for processor(s) 640. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output port(s)/device(s) 660 may be connected to processor(s) 640, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 644 may be implemented in hardware or a combination of hardware and software, and may provide wired or wireless network interface(s) to one or more networks, such as network(s) 426/108. Communication interface(s) 644 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 426/108. In an embodiment, security mechanisms may be used to provide secure communications, as would be understood by one of ordinary skill in the art.

Secondary storage device(s) 658 may store processing logic 668 (e.g., software) to be executed by processor(s) 640, and/or may store data 670. Processing logic 668 and data 670 may be used by processor(s) 640 to facilitate sensor data collection functions, metering functions and/or metering calculations/computations if embodied in a utility meter, and/or communications between devices, etc., according to embodiments of this disclosure. Processing logic 668 may include algorithms/instructions for executing the methodology described herein, such as data communications/messaging, determining and/or evaluation of sensor data, severity index(es), etc., determining one or more actions to take based on the evaluation(s), and carrying out the action(s). Examples of secondary storage device(s) 658 may include one or more hard drive disks, including but not limited to electro-mechanical hard drives, FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 658.

The description herein discloses a communications scheme, as part of an infrastructure of a building or building complex, that would allow a utility metering device at the building or building complex to receive incident-related alerts from a third-party monitoring system co-located with the metering device at the building or complex, and react to the alerts in an expedient manner such that any further danger, property damage, etc., may be avoided. The utility metering device may automatically issue instructions for itself or other utility metering devices to take one or more actions (e.g., to disconnect or halt flow), and/or may send alert information to an associated head-end device (e.g., associated with, or at, a utility office) to determine action(s) (initial or additional) to be carried out. Providing these communications will allow for a more immediate response in potentially dangerous and/or destructive situations. In addition to immediate (possibly even emergency) response, the utility service can also be promptly informed that associated metering devices and other equipment may require servicing or replacement due to potential damage, and technicians may be scheduled in a more timely manner than they would be if this system was not in place.

The particular examples used in this document are for ease of understanding and are not to be limiting. Though the embodiments described are directed to utility metering (e.g., of gas, water, electricity, etc.), features described herein may be used in many other contexts that may or may not involve utility metering (e.g., various communication systems, IoT applications, etc., where nodes associated with a service provider may receive incident information from a third party system, perform an evaluation of the information, and take expedient action(s)). As would be understood by one of ordinary skill in the art, the time-, resource-, and even life-saving features discussed herein may be beneficial in many other systems involving sensors and communication devices (e.g., industrial manufacturing, mining, agriculture, transportation, etc.), including in fields yet unknown.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A metering device comprising:
a processor;
a transceiver communicably coupled with the processor, the transceiver configured to communicate over a network with a safety monitoring system of a physical site at which the metering device is located and with a head-end device associated with a utility provider that services the physical site; and
a memory communicably coupled with the processor, the memory storing instructions that, when executed by the processor, direct the processor to:
receive sensor layout information from the safety monitoring system for sensors used by the safety monitoring system at the physical site;
receive a notification from the safety monitoring system regarding an incident at the physical site, the notification including sensor data from one or more of the sensors;
determine an incident type and one or more severity indexes of the incident based on the sensor layout information and the sensor data;
evaluate the one or more severity indexes against predetermined criteria; and
take at least one action based on the evaluation, wherein the at least one action includes sending a message to one or more other metering devices at the physical site with an instruction to disconnect flow.

2. The metering device of claim 1, wherein the at least one action includes disconnecting flow at the metering device.

3. The metering device of claim 2, wherein the metering device is an electricity meter, and the flow at the metering device is an electricity flow.

4. The metering device of claim 2, wherein the metering device is a gas meter, and the flow at the metering device is a gas flow.

5. The metering device of claim 2, wherein the metering device is a water meter, and the flow at the metering device is a water flow.

6. The metering device of claim 1, wherein the notification includes the sensor layout information.

7. The metering device of claim 1, wherein the sensor layout information includes one or more of: sensor identifications, sensor locations, distances between the sensors, or total area covered by the sensors.

8. The metering device of claim 1, wherein the sensor data includes sensor identification for one or more sensors reporting anomalies, and also includes one or more of: smoke intensities at the reporting sensors, temperatures at the reporting sensors, water pressure at the reporting sensors, humidity levels at the reporting sensors, flood levels at the reporting sensors, fume intensities at the reporting sensors, chemical concentrations at the reporting sensors, toxicity levels at the reporting sensors, or seismic measurements at the reporting sensors.

9. The metering device of claim 1, wherein the notification includes information regarding what action is being taken by the safety monitoring system.

10. The metering device of claim 1, wherein the at least one action includes sending an alarm message to the head-end device regarding an incident at the physical site, the alarm message including one or more of: the incident type, a location of the incident, the one or more severity indexes, the sensor data, the sensor layout information, information regarding what action the metering device is taking, or information regarding what action the safety monitoring system is taking.

11. The metering device of claim 1, wherein the predetermined criteria includes predetermined thresholds of factors including one or more of: smoke intensity, temperature, water pressure, flood level, chemical concentration, toxicity level, or seismic measurement level.

12. A method of assessing, at a metering device associated with a utility provider that services a physical site monitored by a safety monitoring system, an incident at the physical site, the method comprising:
- receiving, via a transceiver of the metering device, sensor layout information for sensors used by the safety monitoring system;
- receiving a notification from the safety monitoring system regarding an incident at the physical site, the notification including sensor data from one or more of the sensors;
- determining an incident type and one or more severity indexes of the incident based on the sensor layout information and the sensor data;
- evaluating the one or more severity indexes against predetermined criteria; and
- taking at least one action based on the evaluation, wherein the at least one action includes sending a message to one or more other metering devices at the physical site with an instruction to disconnect flow.

13. The method of claim 12, wherein taking the at least one action includes disconnecting flow at the metering device.

14. The method of claim 12, wherein taking the at least one action includes sending an alarm message to a head-end device associated with the utility provider, the alarm message including one or more of: the incident type, a location of the incident, the one or more severity indexes, the sensor data, the sensor layout information, information regarding what action the metering device is taking, or information regarding what action the safety monitoring system is taking.

15. At least one non-transitory computer-readable medium having computer program logic stored thereon, the computer program logic including instructions that, when executed by a processor of a metering device associated with a utility provider, directs the processor to:
- receive from a safety monitoring system at a physical site at which the metering device is located, via a transceiver of the metering device, sensor layout information for sensors used by the safety monitoring system;
- receive a notification from the safety monitoring system regarding an incident at the physical site, the notification including sensor data from one or more of the sensors;
- determine an incident type and one or more severity indexes of the incident based on the sensor layout information and the sensor data;
- evaluate the one or more severity indexes against predetermined criteria; and
- take at least one action based on the evaluation, wherein the at least one action includes sending a message to one or more other metering devices at the physical site with an instruction to disconnect flow.

16. The non-transitory computer-readable medium of claim 15, wherein taking the at least one action includes disconnecting flow at the metering device.

17. The non-transitory computer-readable medium of claim 15, wherein taking the at least one action includes sending an alarm message to a head-end device associated with the utility provider, the alarm message including one or more of: the incident type, a location of the incident, the one or more severity indexes, the sensor data, the sensor layout information, information regarding what action the metering device is taking, or information regarding what action the safety monitoring system is taking.

* * * * *